(12) United States Patent
Neuteboom

(10) Patent No.: US 6,265,854 B1
(45) Date of Patent: Jul. 24, 2001

(54) DC/DC CONVERTER WITH BATTERY LOW INDICATOR

(75) Inventor: Harry Neuteboom, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/639,151

(22) Filed: Aug. 16, 2000

(30) Foreign Application Priority Data

Aug. 25, 1999 (EP) .................................................. 99202750

(51) Int. Cl.$^7$ .................................................. G05F 1/652
(52) U.S. Cl. .......................................... 323/222; 323/282
(58) Field of Search .................................. 323/222, 223, 323/282, 285, 288, 351

(56) References Cited

U.S. PATENT DOCUMENTS

| | | | |
|---|---|---|---|
| 3,660,753 | * 5/1972 | Judd et al. | 323/283 |
| 4,672,303 | * 6/1987 | Newton | 323/285 |
| 4,727,308 | * 2/1988 | Huljak et al. | 323/222 |
| 4,876,497 | * 10/1989 | Colver | 323/211 |
| 5,003,454 | * 3/1991 | Bruning | 363/81 |
| 5,180,964 | * 1/1993 | Ewing | 323/222 |
| 5,446,366 | * 8/1995 | Bassett et al. | 323/222 |
| 5,642,027 | * 6/1997 | Windes et al. | 320/1 |
| 5,736,841 | * 4/1998 | Gucyski | 323/222 |
| 5,859,527 | * 1/1999 | Cook | 323/298 |
| 6,011,382 | * 1/2000 | Littlefield et al. | 323/222 |

\* cited by examiner

*Primary Examiner*—Adolf Deneke Berhane
(74) *Attorney, Agent, or Firm*—Steven R. Biren

(57) ABSTRACT

A converter for converting a terminal voltage ($V_{k1}$) supplied by a battery (BT) which is connected between an input terminal (1) and a reference terminal (GND) into an output voltage ($U_0$) across a load ($Z_L$) which is connected between an output terminal (2) and the reference terminal (GND). The converter comprises a first and a second switch ($SW_1$, $SW_2$), a coil (L), a control circuit (CNTRL), a comparator (CMP), a frequency counter (CNT), and an indicator (IND). If the output voltage ($U_0$) is lower than the reference voltage ($V_{RF}$), the start signal (ST) will turn logic high. As a consequence the control circuit (CNTRL) will start an energy transfer cycle for transferring an amount of energy from the battery (BT) to the load ($Z_L$). The frequency of the start signal (ST) increases as the terminal voltage ($V_{k1}$) decreases. By measuring the frequency of the start signal (ST), the indicator (IND) has the possibility of supplying a battery-low indication signal (BTLW) when the battery (BT) is almost empty.

2 Claims, 2 Drawing Sheets

DC/DC CONVERTER WITH BATTERY LOW INDICATOR

BACKGROUND OF THE INVENTION

The invention relates to a converter for converting a terminal voltage of a battery connected between an input terminal and a reference terminal into an output voltage across a load connected between an output terminal and said reference terminal, comprising switching means for controlling the value of the output voltage to the value of a reference voltage, and a control circuit for controlling the switching means.

Such a converter is known from the prior art. Controlling the value of the output voltage takes place by means of pulse width modulation and/or frequency modulation of the switching means.

A disadvantage of the known converter is that it is not provided with a simple and at the same time accurate indicator for supplying a signal indicating that the battery is almost empty.

The load may be, for example, a hearing aid. An accurate indicator for supplying a signal indicating that the battery is almost empty is highly desirable here because in the absence thereof either the hearing aid may fail in an uncontrolled manner (i.e. unexpectedly), or a battery which is not nearly empty yet is replaced.

SUMMARY OF THE INVENTION

It is an object of the invention to provide a converter with a simple and at the same time accurate indicator for supplying an indicator signal signifying that the battery is almost exhausted.

According to the invention, the converter mentioned in the opening paragraph is for this purpose characterized in that the converter comprises comparison means for making a comparison of the output voltage with the reference voltage and for providing a start signal to the control circuit in response to said comparison so as to initiate a energy transport from the battery to the load; frequency detection means for determining the frequency of the start signal; and indication means coupled to the frequency detection means for providing an indication signal when the frequency of the start signal has exceeded a certain limit.

The invention is based on the recognition that the number of times per unit time an energy transfer is to take place from the battery to the load is dependent on the terminal voltage supplied by the battery.

Whenever an energy transfer is to take place, this fact is transmitted by the comparison means to the control circuit of the converter by means of the start signal. The frequency of the start signal is thus directly proportional to the number of energy transfers per unit time. The frequency of the start signal is as a result dependent on the terminal voltage of the battery, and is thus also a measure for the condition of the battery (i.e. how full the battery still is). The frequency detection means determine the frequency of the start signal and pass it on to the indication means. If the limit mentioned above is chosen such that it corresponds to an almost (but not completely) empty battery, the indication signal will give a warning at the correct moment that the battery is to be replaced. The indication signal may be, for example, a pulsatory bleep tone.

An embodiment of a converter according to the invention is characterized in that the converter comprises a coil with a first and a second terminal; and in that the switching means comprise a first switch of which a control electrode is coupled to the control circuit for receiving a first control signal and a second switch of which a control electrode is coupled to the control circuit for receiving a second control signal; and in that the first terminal of the coil is coupled to the input terminal; and in that the first switch is connected between the second terminal of the coil and the reference terminal; and in that the second switch is connected between the second terminal of the coil and the output terminal.

A simple implementation of a converter according to the invention is obtained in this manner. The converter is a so-called inductive converter, i.e. it has a coil which serves to store energy from the battery and to release energy to the load again. The use of the inductive converter implies that the frequency of the start signal rises in proportion as the battery becomes more exhausted.

BRIEF DESCRIPTION OF THE DRAWINGS

The invention will be explained in more detail below with reference to the accompanying drawing, in which.

Identical components or elements have been given the same reference symbols in these Figures.

DESCRIPTION OF THE PREFERRED EMBODIMENTS

Figure 1:
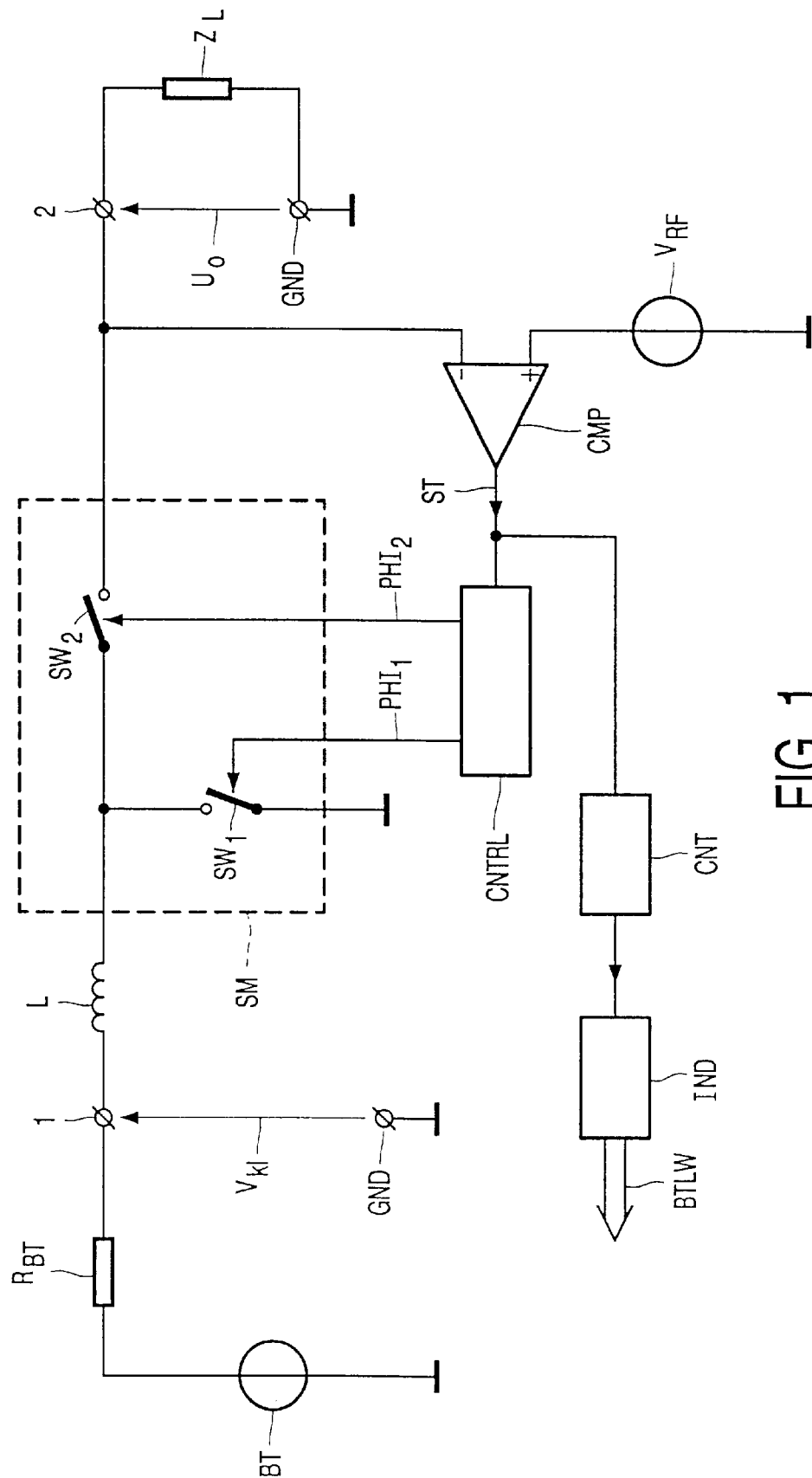
FIG. 1 is a circuit diagram of an embodiment of a converter according to the invention.

FIG. 1 shows a circuit diagram of an embodiment of a converter according to the invention. The converter comprises switching means SM which are implemented with a first switch $SW_1$, and a second switch $SW_2$. A battery BT with an internal resistance $R_{BT}$ is connected between an input terminal 1 and a reference terminal GND. The terminal voltage of the battery BT is referenced $V_{k1}$. A load $Z_L$ is connected between an output terminal 2 and the reference terminal GND. The switches $SW_1$, and $SW_2$ are controlled from a control circuit CNTRL which supplies a first control signal $PHI_1$ and a second control signal $PHI_2$ to the control electrodes of the first switch $SW_1$ and the second switch $SW_2$, respectively. A coil L is connected by a first terminal to the input terminal 1 and by a second terminal to a common junction point of the first switch $SW_1$, and the second switch $SW_2$. The first switch $SW_1$, is connected between the second terminal of the coil L and the reference terminal GND. The second switch $SW_2$ is connected between the second terminal of the coil L and the output terminal 2. The converter is further provided with comparison means CMP which are constructed with a comparator CMP, frequency detection means CNT which may be provided with, for example, a frequency counter CNT, and indication means IND. When the frequency of the start signal ST has exceeded a certain limit, which certain limit is chosen such that it corresponds to an almost (but not completely) empty battery BT, the indication signal BTLW supplied by the indicator IND will indicate at the correct moment that the battery BT is to be replaced. The indication signal BTLW may be, for example, a pulsatory bleep tone.

Figure 2:
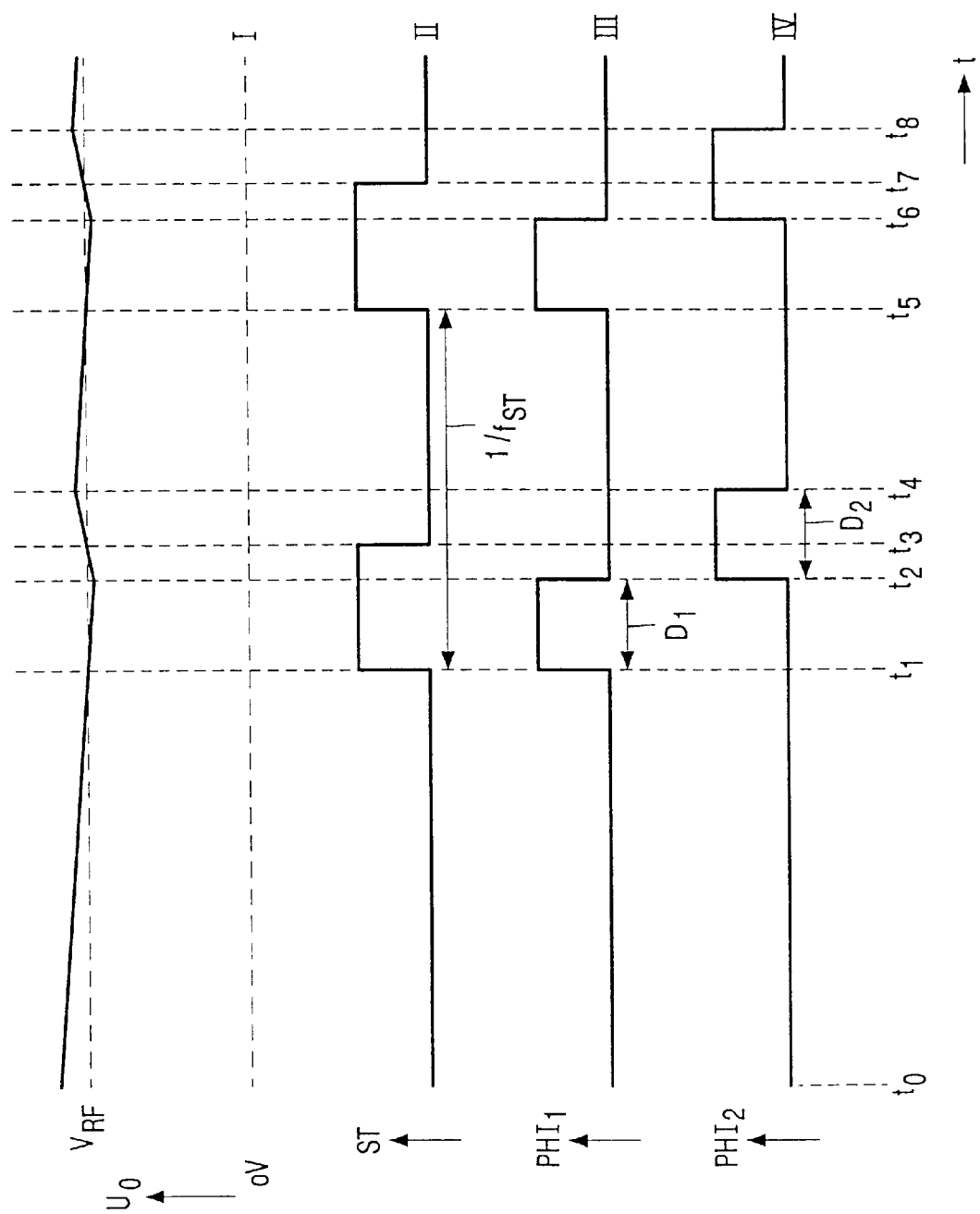
FIG. 2 shows a set of signal diagrams I–IV for a further clarification of the operation of the embodiment as shown in FIG. 1.

The operation of the embodiment of the converter of FIG. 1 will now be explained with reference to the set of signal diagrams I–IV shown in FIG. 2.

The output voltage $U_O$ is greater than the reference voltage $V_{RF}$ between moment $t_0$ and moment $t_1$, so that the start signal ST has a logic low level. As a result, the first and the second control signal $PHI_1$, and $PHI_2$ are both logic low, so that the first and the second switch $SW_1$, and $SW_2$ are both open (non-conducting). In other words, there is no energy transfer from the battery BT to the load $Z_L$ between the moments $t_0$ and $t_1$. Starting from the moment $t_1$, the output voltage $U_0$ has fallen (owing to the load $Z_L$) to below the reference voltage $V_{RF}$. This makes the start signal ST logic high, and an energy transfer cycle is started by the control circuit CNTRL. The energy transfer cycle consists in that first the first control signal $PHI_1$, becomes logic high for a time duration $D_1$, and immediately afterwards the second control signal $PHI_2$ becomes logic high for a time duration $D_2$. During the period $D_1$, the first switch $SW_1$, is closed and the second switch $SW_2$ is open. As a result, energy supplied by the battery BT is stored in the coil L during the period $D_1$. The first switch $SW_1$ is open and the second switch $SW_2$ is closed during the period $D_2$. The result of this is that during the period $D_2$ the energy stored during the period $D_1$ is supplied to the load $Z_L$. The output voltage $U_0$ rises during the period $D_2$ as a result of this. This renders the output voltage $U_0$ greater than the reference voltage $V_{RF}$ again, in this example at moment $t_3$. As a result, the start signal ST becomes logic low again, and this means that at moment $t_4$ the energy transfer cycle is ended. In this example, the moment $t_3$ starting from which the output voltage $U_0$ lies above the reference voltage $V_{RF}$ again occurs before the (first) energy transfer cycle has ended. If this is not the case, one or several energy transfer cycles will follow until the output voltage $U_0$ has become higher than the reference voltage $V_{RF}$ again, upon which no further energy transfer cycles will follow as long as the output voltage $U_0$ remains higher than the reference voltage $V_{RF}$. In FIG. 2, the output voltage $U_0$ is lower than the reference voltage $V_{RF}$ again from the moment $t_5$. The moments $t_5$–$t_8$ correspond to the moments $t_1$–$t_4$. The frequency $f_{ST}$ of the start signal ST is equal to the inverse of the cycle time of the start signal ST, which cycle time in FIG. 2 is equal to the time period between the moments $t_1$, and $t_5$. As the battery BT becomes more exhausted, the output voltage $U_0$ will drop at an increasingly fast rate at the moments when the switch $SW_2$ is open. This causes the start frequency $f_{ST}$ to rise.

The converter may be assembled from discrete components or it may be implemented in an integrated circuit.

What is claimed is:

1. A converter for converting a terminal voltage ($V_{k1}$) of a battery (BT) connected between an input terminal (1) and a reference terminal (GND) into an output voltage ($U_0$) across a load ($Z_L$) connected between an output terminal (2) and said reference terminal (GND), comprising switching means (SM) for controlling the value of the output voltage ($U_0$) to the value of a reference voltage ($V_{RF}$), and a control circuit (CNTRL) for controlling the switching means (SM), characterized in that the converter comprises comparison means (CMP) for making a comparison of the output voltage ($U_0$) with the reference voltage ($V_{RF}$) and for providing a start signal (ST) to the control circuit (CNTRL) in response to said comparison so as to initiate a energy transport from the battery (BT) to the load ($Z_L$); frequency detection means (CNT) for determining the frequency ($f_{ST}$) of the start signal (ST); and indication means (IND) coupled to the frequency detection means (CNT) for providing an indication signal (BTLW) when the frequency ($f_{ST}$) of the start signal (ST) has exceeded a certain limit.

2. A converter as claimed in claim 1, characterized in that the converter comprises a coil (L) with a first and a second terminal; and in that the switching means (SM) comprise a first switch ($SW_1$) of which a control electrode is coupled to the control circuit (CNTRL) for receiving a first control signal ($PHI_1$) and a second switch ($SW_2$) of which a control electrode is coupled to the control circuit (CNTRL) for receiving a second control signal ($PHI_2$); and in that the first terminal of the coil (L) is coupled to the input terminal (1); and in that the first switch ($SW_1$) is connected between the second terminal of the coil (L) and the reference terminal (GND); and in that the second switch ($SW_2$) is connected between the second terminal of the coil (L) and the output terminal (2).

\* \* \* \* \*